Figure 1:
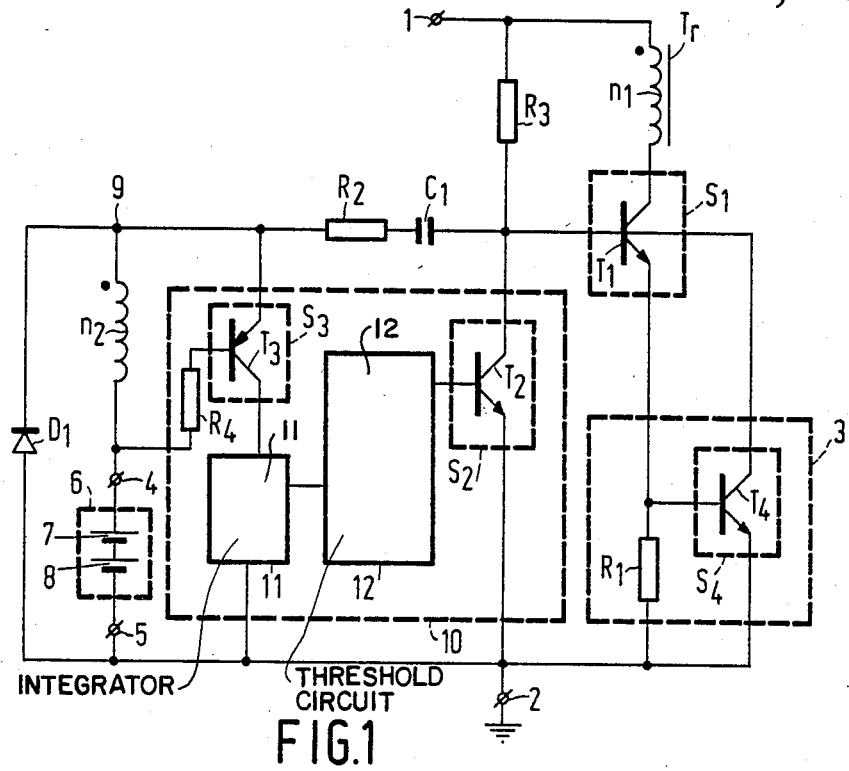

United States Patent [19]

Munnig Schmidt et al.

[11] Patent Number: 4,647,833
[45] Date of Patent: Mar. 3, 1987

[54] POWER-SUPPLY CIRCUIT

[75] Inventors: Robert H. Munnig Schmidt; Lammert Ter Heide, both of Drachten, Netherlands

[73] Assignee: U.S. Philips Corporation, New York, N.Y.

[21] Appl. No.: 821,937

[22] Filed: Jan. 24, 1986

[30] Foreign Application Priority Data

Nov. 11, 1985 [NL] Netherlands ............ 8503088

[51] Int. Cl.$^4$ .............................. H02J 7/00
[52] U.S. Cl. ........................ 320/21; 320/2; 320/32; 323/274; 323/284; 363/21
[58] Field of Search ........... 320/2, 21, 32; 323/265, 323/271, 273, 274, 282, 284; 363/20, 21; 361/79, 88, 89, 98

[56] References Cited

U.S. PATENT DOCUMENTS

| | | | |
|---|---|---|---|
| 4,187,536 | 2/1980 | Govaert et al. | 320/2 |
| 4,376,263 | 3/1983 | Pittroff et al. | 320/32 |
| 4,441,147 | 4/1984 | Schwarz | 363/21 |
| 4,504,775 | 3/1985 | Becker | 320/32 |

Primary Examiner—Patrick R. Salce
Assistant Examiner—Anita M. Ault
Attorney, Agent, or Firm—Robert T. Mayer; Bernard Franzblau

[57] ABSTRACT

A flyback converter for charging a battery (6) from different input voltages in which, during the forward interval, a linearly increasing current flows through a transformer primary winding ($n_1$). The current is turned off by a first switch ($S_1$) at a value dictated by switching means (3). During the flyback interval the energy stored in the transformer ($T_r$) is supplied to the battery as a charging current via the secondary winding ($n_2$) and a diode ($D_1$). The voltage pulses appearing across the secondary winding during the forward intervals are applied to an integrator (11) via a third switch ($S_3$). The integrator intergrates these voltage pulses. If the output voltage of the integrator (11) exceeds a first threshold value a threshold circuit (12) is activated and turns on a second switch ($S_2$) to disable the flyback converter. If subsequently the output voltage of the integrator decreases below a second threshold value, the second switch is turned off again by the threshold circuit so that the flyback converter can be restarted. In this way the average value of the voltage across the secondary winding during the forward intervals is maintained substantially constant. Thus, the flyback converter constitutes a constant-power source, the power supplied to the battery (6) being constant and independent of the input voltage.

16 Claims, 5 Drawing Figures

POWER-SUPPLY CIRCUIT

The invention relates to a power-supply circuit for charging a battery, comprising a primary winding of a transformer and a first semiconductor switch arranged in series between two input terminals for applying an input voltage, further comprising the series arrangement of a secondary winding of the transformer and a diode with connection terminals for connection the battery, and also comprising first means for turning off the first semiconductor switch at a specific value of the current through the primary winding.

Such a circuit can be employed for charging a battery by input voltages of different values. The input voltage may be either a rectified alternating voltage or a direct voltage. Such a circuit is particularly suitable for use in an electric shaver in which the circuit is employed for charging the battery and/or energising the motor, The shaver can then operate on the different mains voltages in various countries without adaptation or change-over.

A power-supply circuit of the type defined in the opening paragraph is known, for example from European Patent Specification No. 30026 and from British Patent Application No. 2,138,977. In these known circuits a current flows in the primary winding during the so-called forward interval, as a result of which energy is stored in the transformer. At a specific value of the primary current the first semiconductor switch is turned off, thereby interrupting the primary current. The energy stored is then delivered to the battery in the form of a charging current via the secondary winding and the diode during the so-called flyback interval.

During the forward interval the primary current increases as a linear function of time, the slope being proportional to the input voltage. As a result of this, the value of the primary current for which the semiconductor switch is turned off is reached more rapidly as the input voltage increases. This leads to a higher switching frequency of the power-supply circuit, causing the average charging current to increase as the input voltage increases.

In order to keep the charging current as constant as possible over a wide range of input voltages, the circuit known from said European Patent Specification No. 30026 compensates for this effect by feed-forward control, the first semiconductor switch being turned off at a primary current which decreases as the input voltage increases.

In the circuit known from British Patent Application No. 2,138,977 the average charging current is maintained constant by means of negative feedback, which also results in turning-off at a primary current which decreases as the input voltage increases.

These known circuits are both high-speed charging devices by means of which a battery is charged with a comparatively large and constant charging current. However, in these known charging devices additional steps are required in order to enable a battery to be charged with a comparatively small charging current. In order to obtain a small charging current it is possible to reduce the value at which the primary current is turned off and consequently to reduce the length of the forward intervals, but this has the disadvantage that the charging current becomes strongly dependent on the turn-off delay of the first semiconductor switch. This turn-off delay is constant and results in the primary current overshooting the turn-off value increasingly as the input voltage increases, so that the charging current is likely to become much larger than the desired value.

Therefore, it is an object of the invention to provide a power-supply circuit which is also suitable for delivering a comparatively small charging current. According to the invention a power-supply circuit of a type defined in the opening paragraph is characterized in that the circuit comprises second means for maintaining the average value of the voltage across the secondary winding substantially constant in the on-state of the first semiconductor switch. As the average value of the secondary voltage is maintained constant during the forward intervals the power-supply circuit constitutes a constant-power source, the power supplied to the battery being constant and independent of the input voltage. By means of such a constant-power source a small charging current can be obtained in that instead of the primary current the secondary voltage is used as the control criterion during the forward intervals. The means for maintaining this voltage constant each time interrupt the operation of the circuit and consequently do not influence the length of the forward intervals, so that the effect of the turn-off delay is negligible.

In another embodiment the power supply circuit is characterized in that the second means comprise:

an integrator having an output for integrating the voltage across the secondary winding in the on-state of the first semiconductor switch, a second semiconductor switch for turning off the first semiconductor switch, and a threshold switch for turning on the second semiconductor switch above a first voltage on the output of the integrator and for turning off the second semiconductor switch below a second voltage on the output of the integrator. This embodiment may be characterized further in that the threshold circuit comprises a Schmitt trigger and in that the integrator comprises the series arrangement of a first resistor and a capacitor, which series arrangement is coupled by a third semiconductor switch to that end of the secondary winding which is positive in the on-state of the first semiconductor switch. In yet another embodiment the third semiconductor switch comprises a transistor whose emitter is coupled to said positive end, whose base is coupled to the other end of the secondary winding by a second resistor, and whose collector is coupled to the first resistor. In a further embodiment the third semiconductor switch may comprise a diode.

If in still further embodiment the first switching means comprise a third resistor which is arranged in series with the first semiconductor switch abd which is coupled to a fourth semiconductor switch for turning off the first semiconductor switch, it may be advantageous if the second and the fourth semiconductor switch are commoned to form one semiconductor switch.

Figure 2:
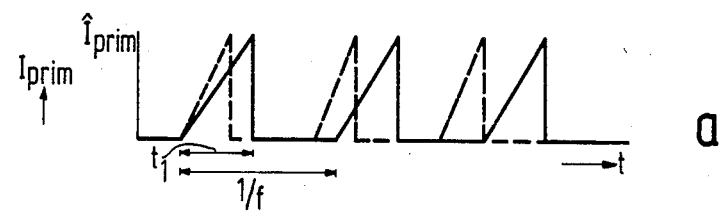
Figure 2:
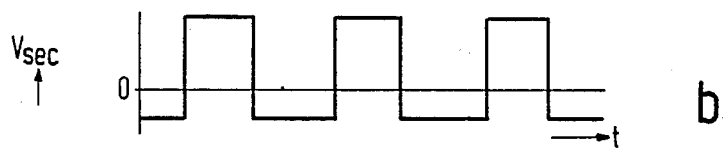
Figure 4:
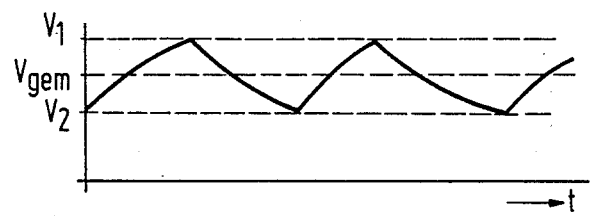
Figure 3:
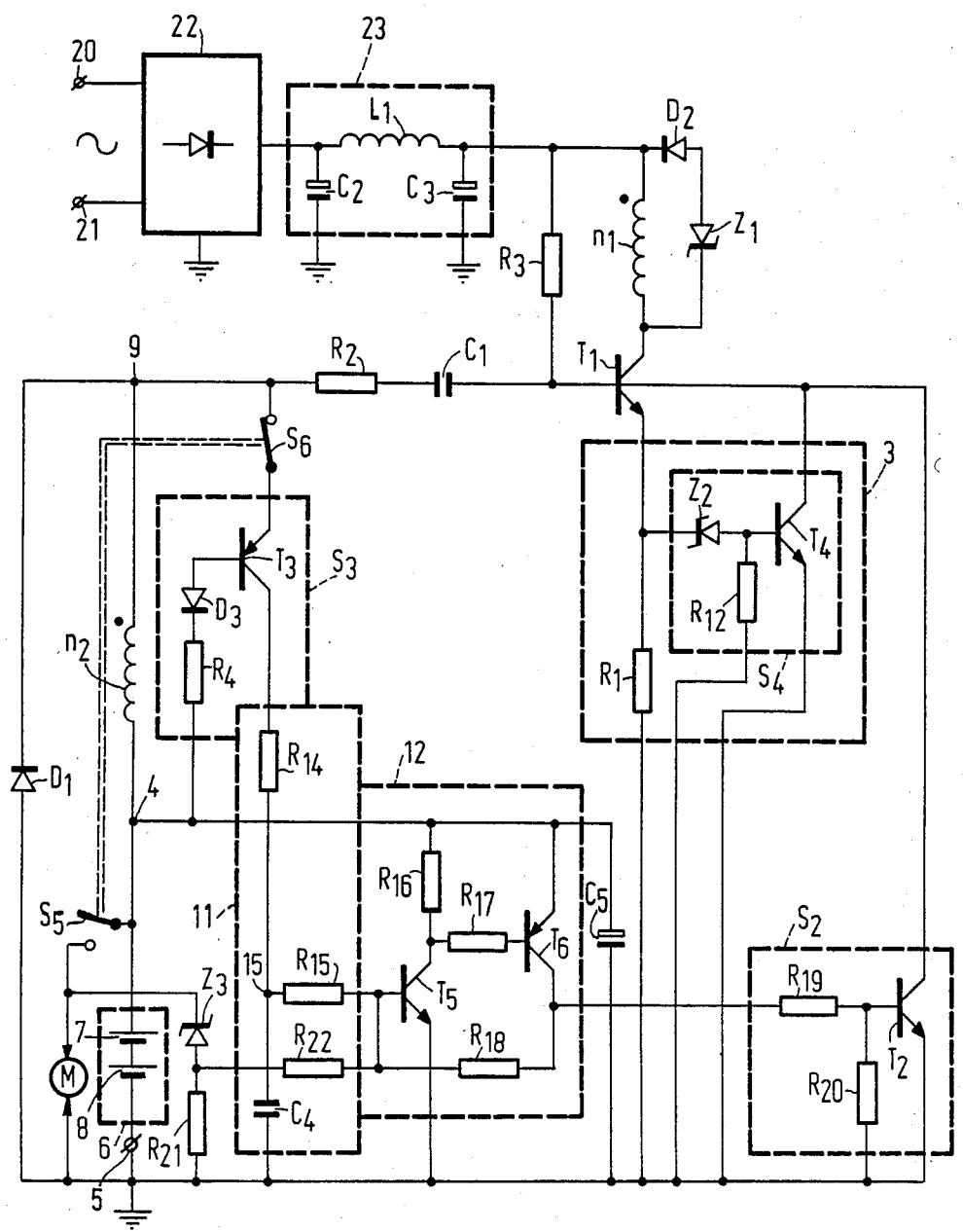
Figure 5:
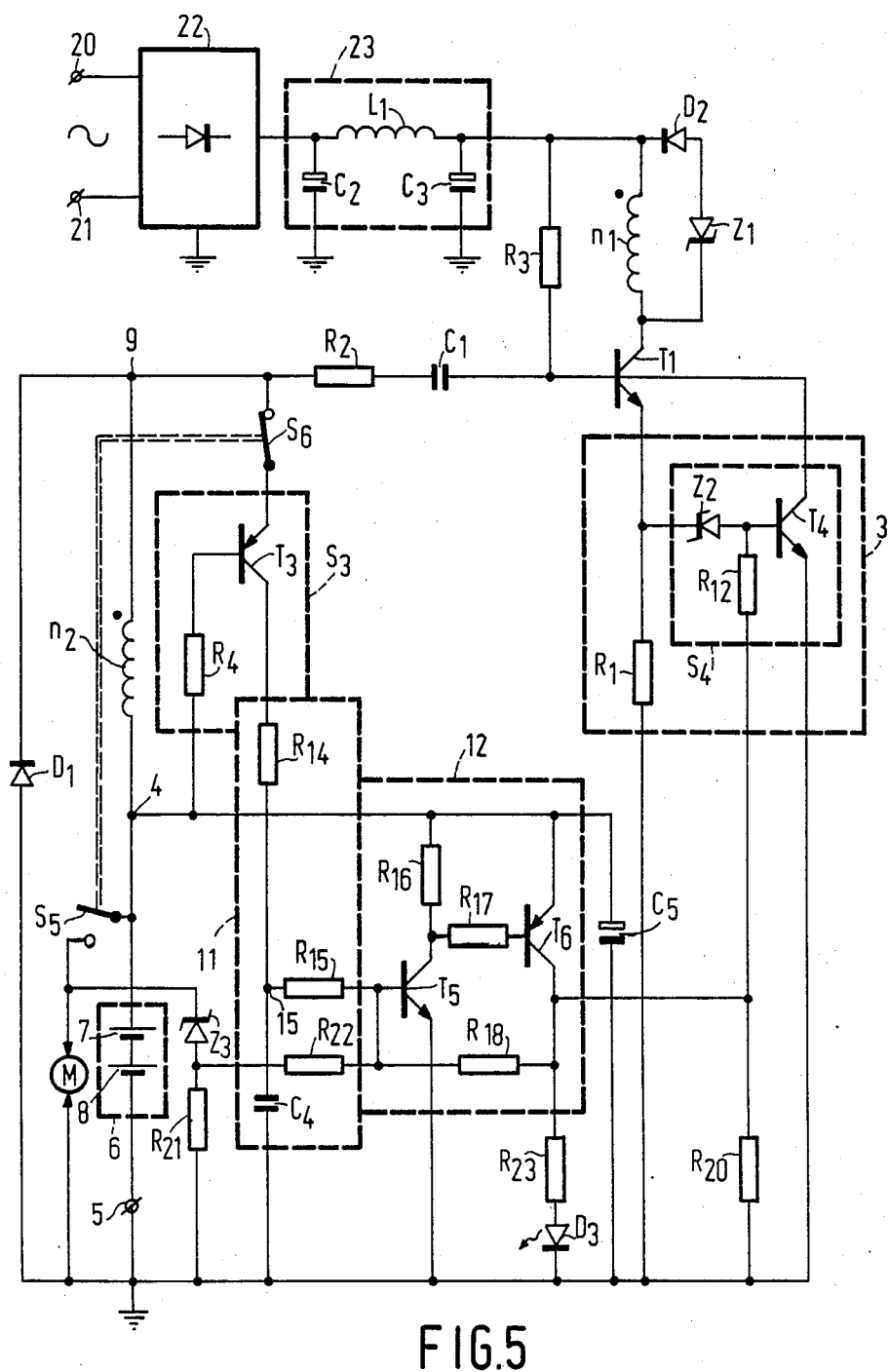

Embodiments of the invention will now be described in more detail, by way of example, with reference to the accompanying drawings, in which:

FIG. 1 is a basic diagram of a power-supply circuit in accordance with the invention, FIG. 2 shows some characteristics to explain the operation of the circuit shown in FIG. 1, FIG. 3 shows a first embodiment of the invention, FIG. 4 shows the waveform of the voltage on the output of the integrator in the circuit of FIG. 3, and FIG. 5 shows a second embodiment of the invention.

FIG. 1 is a basic diagram of a power-supply circuit in accordance with the invention. The circuit comprises two input terminals 1 and 2 for applying an input voltage, which may be a rectified alternating voltage or a direct voltage. A primary winding $n_1$ of a transformer $T_r$, the collector-emitter path of a transistor $T_1$ which constitutes the first semiconductor switch $S_1$, and a resistor $R_1$ are arranged in series between these terminals 1 and 2. This resistor $R_1$ is connected to the base of a transistor $T_4$ constituting the fourth semiconductor switch $S_4$. The resistor $R_1$ together with the semiconductor switch $S_4$ constitutes the first means 3 for turning off the first semiconductor switch $S_1$ depending on the value of the primary current. The circuit further comprises the series arrangement of a secondary winding $n_2$ and a diode $D_1$ with terminals 4 and 5 between which a battery 6 is connected. In the present example this battery 6 comprises two series-connected nickel-cadmium cells 7 and 8. The end 9 of the secondary winding $n_2$ is connected to the base of the transistor $T_1$ by a positive-feedback network comprising the series arrangement of a resistor $R_2$ and a capacitor $C_1$. Further, the base of the transistor $T_1$ is connected to the input terminal 1 via a starting resistor $R_3$.

The circuit further comprises second means 10 for turning off the first semiconductor switch $S_1$ depending on the average voltage across the secondary winding $n_2$ during the forward intervals. These means 10 comprise an integrator 11, which is connected to the end 9 of the secondary winding $n_2$ by means of the collector-emitter path of a transistor $T_3$ constituting the third semiconductor switch $S_3$. The base of this transistor $T_3$ is connected to the other end 4 of the winding $n_2$ by a resistor $R_4$. The output of the integrator 11 is connected to the input of a threshold circuit 12, which comprises for example a Schmitt trigger. Above a first threshold voltage this threshold circuit 12 turns on a transistor $T_2$ constituting the second semiconductor switch $S_2$, so that the first semiconductor switch $S_1$ is turned off. Below a second threshold voltage the transistor $T_2$ is cut off, enabling the first semiconductor switch $S_1$ to be turned on again.

The circuit operates as follows. If an input voltage is present on the terminals 1 and 2 a small current flows into the base of the transistor $T_1$ via the starting resistor $R_3$, so that this transistor is partly driven into conduction. The resulting current through the primary winding $n_1$ causes the voltage across the secondary winding $n_2$ to increase so that the transistor $T_1$ is driven further into conduction via the positive-feedback network comprising the resistor $R_2$ and the capacitor $C_1$. This positive feedback ensures that the transistor $T_1$ is rapidly bottomed. The current through the primary winding $n_1$ subsequently increases as a linear function of time during the forward interval. For a value of the primary current which is defined by the resistance value of the resistor $R_1$ the transistor $T_4$ is turned on, so that the transistor $T_1$ is cut off. Owing to the absence of the primary current the polarity of the voltage across the secondary winding $n_2$ is reversed, so that the diode $D_1$ is turned on. The energy stored in the transformer $T_r$ during the forward interval is then supplied to the battery 6 in the form a charging current in the flyback interval. This current decreases to zero as a linear function of time. During the flyback interval the voltage on the end 9 of the secondary winding is dictated by the voltage across the diode $D_1$. At the end of the flyback interval the voltage across the winding $n_2$ becomes zero volts, so that the voltage on the end 9 becomes equal to the battery voltage. This positive voltage step on the end 9 ensures that the next forward interval is started, unless this is inhibited by the means 10 whose operation will now be described in more detail.

The voltage across the secondary winding $n_2$ is constant during the forward intervals and is governed by the input voltage and the winding ratio of the transformer $T_r$. The voltage on the end 9 is then positive relative to the voltage on the end 4, so that the transistor $T_3$ conducts during the forward intervals. The voltage pulses appearing across the secondary winding during the forward intervals are therefore applied to the integrator 11, which integrates these voltage pulses. Consequently, a voltage will appear on the output of the integrator 11 which is substantially proportional to the average value of the voltage across the secondary winding $n_2$ over the preceding forward intervals. If after a number of forward intervals this voltage exceeds the first threshold value of the threshold circuit 12 the transistor $T_2$ is turned on and consequently the transistor $T_1$ is turned off. The transistor $T_1$ remains cut off until the voltage on the output of the integrator 11 decreases below the second threshold value of the threshold circuit 12 owing to the absence of charging pulses. The transistor $T_2$ is then turned off, so that the transistor $T_1$ is enabled for a new forward interval. In this way the operation of the circuit is interrupted for a number of intervals each time that the first threshold value of the threshold circuit exceeded. As the input voltage increases the voltage across the secondary winding $n_2$ increases during the forward intervals. Moreover, as the input voltages increases the frequency of the forward intervals also increases because at an increasing input voltage the primary current rises more rapidly and consequently the value at which the primary current is turned off is reached more rapidly. Therefore the time covered by the number of forward intervals required for reaching the first threshold value of the threshold circuit 12 decreases as the input voltage increases, so that at increasing input voltage the operation of the circuit is always interrupted after shorter periods.

Thus, in the manner described above the maximum value of the primary current during the forward intervals in the circuit in accordance with the invention is maintained constant and independent of the input voltage, and the average value of the voltage across the secondary winding during the forward intervals is also maintained substantially constant and independent of the input voltage. By maintaining these two parameters constant the power-supply to the battery is maintained constant and independent of the input voltage. This is not the case in the known circuits which constitute a constant-current source, in which the average charging current is maintained constant and independent of the input voltage. However, in accordance with the inventive idea the average charging current need not be constant but should be inversely proportional to the battery voltage, i.e. the charging current is comparatively large when the battery is almost exhausted and comparatively small when the battery is almost full. For such a dependence of the charging current the circuit constitutes a constant-power source. By means of FIG. 2 it will be explained that a constant-power source can be obtained by maintaining the maximum primary current and said average secondary voltage substantially constant.

The power $P_u$ supplied to the battery is substantially equal to the power built up during the forward intervals, i.e.:

$$P_u = \tfrac{1}{2} L_{prim} \hat{I}_{prim}^2 \cdot f \cdot \eta \tag{1}$$

or $$P_u \doteq \hat{I}_{prim}^2 \cdot f$$

where
 $L_{prim}$ = the inductance of the primary winding
 $\hat{I}_{prim}$ = the maximum value of the primary current,
 $f$ = the frequency of the forward intervals and
 $\eta$ = the efficiency of the circuit.

In FIG. 2a the variation of the current through the primary winding $I_{prim}$ is plotted as a function of time for a specific input voltage $V_1$, this variation being represented in broken lines for a higher input voltage $V_i$. The switching means 3 (see FIG. 1) switch off the primary current $I_{prim}$ independently of the mains voltage at the same maximum value $\hat{I}_{prim}$. The time within which this value is reached is given by:

$$t_1 = (L_{prim}/V_{in}) \cdot \hat{I}_{prim} \tag{2}$$

It follows that as the input voltage $V_i$ increases this time decreases, or the frequency of the forward intervals increases.

In FIG. 2b the variation of the voltage $V_{sec}$ across the secondary winding is plotted as function of time. The value of this voltage during the forward intervals for a given transformation ratio is proportional to the input voltage $V_i$. From equation (2) it follows that the area of the voltage pulses during the forward intervals is proportional to the maximum value of the primary current $\hat{I}_{prim}$, so that this area is independent of the input voltage $V_i$. The average value $V_{gem}$ of the voltage across the secondary winding during the forward intervals then complies with:

$$V_{gem} \doteq \hat{I}_{prim} \cdot f \tag{3}$$

From equations (1) and (3) it then follows that the output power is:

$$P_u \doteq V_{gem} \cdot \hat{I}_{prim} \tag{4}$$

This shows that a constant output power is obtained by maintaining the maximum value of the primary current and the average value of the voltage across the secondary winding constant during the forward intervals.

FIG. 3 shows a first embodiment of the invention. Identical parts bear the same reference numerals as in FIG. 1. An alternating voltage is applied to a rectifier bridge 22 via two terminals 20 and 21. The rectified voltage is smoothed by means of a filter 23 comprising two capacitors $C_2$ and $C_3$ and a coil $L_1$. A zener diode $Z_1$ in series with a diode $D_2$ is arranged in parallel with the primary winding $n_1$ in order to prevent switching transients when the current through the primary is turned off. In the present embodiment, the first means 3 for turning off the transistor $T_1$ depending on the value of the primary current comprise a current-sensing resistor $R_1$ across which the series arrangement of a zener diode $Z_2$ and a resistor $R_{12}$ is connected, the base-emitter junction of a transistor $T_4$ being connected in parallel with this resistor $R_{12}$. The zener diode $Z_2$ accurately defines the voltage at which the transistor $T_4$ is turned on and consequently the value at which the primary current is switched off.

The base of the transistor $T_3$ is connected to the end 4 of the secondary winding $n_2$ by means of the series arrangement of a light-emitting diode $D_3$ and a resistor $R_4$. The diode $D_3$ blinks at the rate at which the transistor $T_3$ is turned on. However, as a result of the high blinking rate, this diode appears to be lit continuously to the human eye. In this way the diode $D_3$ provides an indication that the battery 6 is being charged. The resistor $R_4$ is a current-limiting resistor.

The integrator 11 comprises the series arrangement of a capacitor $C_4$ and a resistor $R_{14}$ which is connected to the collector of the transistor $T_3$. The resistor $R_{14}$ determines the magnitude of the current pulses which correspond to the voltage appearing across the secondary winding during the forward intervals. A resistor $R_{15}$ connects the output 15 of the integrator 11 to the input of the threshold circuit 12, which in the present embodiment comprises a Schmitt trigger. This Schmitt trigger comprises a transistor $T_5$ whose collector is connected to the positive pole 4 of the battery 6 via a resistor $R_{16}$ and to the base of a transistor $T_6$ via a resistor $R_{17}$, which transistor $T_6$ has its emitter also connected to the pole 4 of the battery 6. A large capacitor $C_5$ is arranged across the battery 6 to protect the circuit in the case of an open-circuited battery. A resistor $R_{18}$ provides feedback from the collector of the transistor $T_6$, which constitutes the output of the threshold circuit 12, to the base of the transistor $T_5$. By means of a voltage divider comprising the resistor $R_{19}$ and $R_{20}$ the collector of the transistor $T_6$ is connected to the base of a transistor $T_2$, whose collector is connected to the base of the transistor $T_1$.

The operation of the Schmitt trigger 12 is assumed to be well-known and will not be explained any further. As a result of the integration of the current pulses which are proportional to the secondary voltage the voltage on the output 15 of the integrator 11 increases gradually. If this voltage exceeds the first threshold value $V_1$ the voltage on the collector of the transistor $T_6$ changes from a low to a high value, so that the transistor $T_2$ is turned on and consequently the transistor $T_1$ is turned off. When the capacitor $C_4$ is discharged via the resistor $R_{15}$, $R_{21}$ and $R_{22}$ the voltage on the output 15 decreases gradually. If this voltage has decreased below the second threshold value $V_2$ the voltage on the collector of the transistor $T_6$ again changes from a high value to a low value, so that the transistor $T_2$ is turned off and the transistor $T_1$ can be turned on again. FIG. 4 shows the voltage waveform on the output 15 of the integrator 11. The average value of the voltage on this output 15 is substantially constant, so that the average value of the voltage appearing across the secondary winding during the forward intervals is also constant.

By means of a switch $S_5$ a motor M can be connected in parallel with the battery 6. This motor M is, for example, the motor of an electric shaver. In the emitter line of the transistor $T_3$ a switch $S_6$ is arranged which is opened at the same time that the switch $S_5$ is closed. The series arrangement of a zener diode $Z_2$ and a resistor $R_{21}$ is connected in parallel with the motor M. The anode of the zener diode $Z_3$ is connected to the input of the threshold circuit 12 via a resistor $R_{22}$. In the closed positions of the switches $S_5$ and $S_6$ the circuits supplies the full motor current. The zener diode $Z_3$ then limits the voltage across the motor M and consequently that across the battery 6. If this voltage becomes too high the zener diode $Z_3$ breaks down, so that the transistor $T_2$ is turned on via the threshold circuit 12, as a result of which the transistor $T_1$ is cut off. In the absence of an input voltage on the terminals 20 and 21 the motor M is energised by the battery when the switch $S_5$ is closed.

FIG. 5 shows a power-supply circuit in a second embodiment of the invention, identical parts bearing the same reference numerals as in FIG. 3. The circuit differs from the circuit shown in FIG. 3 in that the transistor $T_2$ and the transistor $T_4$ are commoned to form a single transistor $T_4$. The output of the threshold circuit 12 is connected to the tapping of a voltage divider which comprises the resistors $R_{12}$ and $R_{20}$ and which is arranged in parallel with the base-emitter junction of the transistor $T_4$. Another difference with the circuit of FIG. 3 is that the light-emitting diode $D_3$ which indicates that the battery 6 is being charged is not arranged in the base line of the transistor $T_3$ but is arranged in series with a resistor $R_{23}$ across the output of the threshold circuit. In the present circuit the third semiconductor switch $S_3$ may be constituted by a diode or a diode-connected transistor, in which last-mentioned case the base of the transistor $T_3$ is connected directly to the collector. Further, the circuit operates in the same way as that shown in FIG. 3.

The invention is not limited to the present embodiments. Instead of single transistors the transistor switches $S_1$ to $S_4$ may comprise compound transistors or a combination of one or more transistors with other elements. Instead of by a Schmitt trigger the threshold circuit may be constituted by any other circuit having two different threshold voltages. Further, the integrator 11 may be constructed in another manner than shown.

What is claimed is:

1. A power-supply circuit for charging a battery, comprising two input terminals for applying an input voltage, a primary winding of a transformer and a first semiconductor switch connected in series between said two input terminals, a series arrangement of a secondary winding of the transformer and a diode with connection terminals for connecting to the battery, first switching means for turning off the first semiconductor switch at a specific value of the current throught the primary winding, and second means for maintaining the average of the voltage across the secondary winding substantially constant in the on-state of the first semiconductor switch.

2. A power-supply circuit as claimed in claim 1, characterized in that the second means comprise:
   an integrator having an output, said integrator integrating the voltage across the secondary winding in the on-state of the first semiconductor switch,
   a second semiconductor switch for turning off the first semiconductor switch, and
   a threshold switch for turning on the second semiconductor switch above a first voltage at the output of the integrator and for turning off the second semiconductor switch below a second voltage at the output of the integrator.

3. A power-supply circuit as claimed in claim 2, characterized in that the threshold circuit comprises a Schmitt trigger.

4. A power-supply circuit as claimed in claim 3 wherein the integrator comprises a series arrangement of a first resistor and a capacitor coupled by a third semiconductor switch to an end of the secondary winding which is positive in the on-state of the first semiconductor switch.

5. A power-supply circuit as claimed in claim 2, characterized in that the integrator comprises a series arrangement of a first resistor and a capacitor, coupled by a third semiconductor switch to that end of the secondary winding which is positive in the on-state of the first semiconductor switch.

6. A power-supply circuit as claimed in claim 5, characterized in that the third semiconductor switch comprises a transistor having an emitter connected to said positive end, a base connected to the other end of the secondary winding of the secondary winding by a second resistor, and a collector coupled to the first resistor.

7. A power-supply circuit as claimed in claim 6, characterized in that a light emitting diode is arranged in the base line of the transistor.

8. A power supply circuit as claimed in claim 5, characterized in that the third semiconductor switch comprises a diode having an anode coupled to the end of the secondary winding which is positive in the on-state of the first semiconductor switch.

9. A power-supply circuit as claimed in claim 5 wherein the circuit comprises a further switch for connecting a motor in parallel with the battery and another switch for simultaneously disconnecting the integrator from the secondary winding.

10. A power-supply circuit as claimed in claim 2, characterized in that an output of the threshold circuit is connected to a point of fixed potential by a light-emitting diode.

11. A power-supply circuit as claimed in claim 2, characterized in that the first switching means comprise a third resistor connected in series with the first semiconductor switch and which is coupled to a fourth semiconductor switch for turning off the first semiconductor switch.

12. A power-supply circuit as claimed in claim 11, characterized in that the second semiconductor switch and fourth semiconductor switch are commoned to form one semiconductor switch.

13. A power-supply circuit as claimed in claim 2, characterized in that the circuit comprises a fifth switch for connecting a motor in parallel with the battery and a sixth switch for simultaneously disconnecting the integrator from the secondary winding.

14. A power-supply circuit as claimed in claim 13, characterized in that the motor is connected to an input of the threshold circuit via a zener diode.

15. A power-supply circuit as claimed in claim 1 wherein the first switching means comprises a third resistor connected in series with the first semiconductor switch and which is coupled to a second semiconductor switch for turning off the first semiconductor switch.

16. A shaving apparatus comprising a motor which receives power from a power-supply circuit, the power-supply circuit charging a battery and comprising two input terminals for applying an input voltage, a primary winding of a transformer and a first semiconductor switch connected in series between the two input terminals, a series arrangement of a secondary winding of the transformer and a diode with connection terminals for connecting to the battery, first means for turning off the first semiconductor switch at a specific value of the current through the primary winding, and second means for maintaining the average of the voltage across the secondary winding substantially constant in the on-state of the first semiconductor switch.

* * * * *